United States Patent [19]

Steinberg et al.

[11] Patent Number: 5,611,546
[45] Date of Patent: Mar. 18, 1997

[54] LABYRINTH SEAL HAVING A PRESSURE INDUCING FAN MEANS

[75] Inventors: Christoph Steinberg, Oberasbach; Bernd Preusse, Stein, both of Germany

[73] Assignee: Siemens Aktiengesellschaft, München, Germany

[21] Appl. No.: 444,078

[22] Filed: May 17, 1995

[30] Foreign Application Priority Data

May 17, 1994 [DE] Germany .......................... 44 17 239.7

[51] Int. Cl.⁶ ................................................ F16J 15/447
[52] U.S. Cl. ................................ 277/3; 277/53; 277/67
[58] Field of Search .............................. 277/53–57, 25, 277/67, 3; 384/480, 144

[56] References Cited

U.S. PATENT DOCUMENTS

| 1,463,018 | 7/1923 | Junggren | 277/53 |
|---|---|---|---|
| 2,188,856 | 1/1940 | Chievitz | 286/5 |
| 3,731,940 | 5/1973 | Spruiell | 277/12 |
| 4,560,172 | 12/1985 | Zimmermann et al. | 277/3 |
| 4,743,034 | 5/1988 | Kakabaker et al. | 277/56 |
| 5,238,166 | 8/1993 | Schwarstein et al. | 277/53 |

FOREIGN PATENT DOCUMENTS

| 1313207 | 1/1993 | Canada . | |
|---|---|---|---|
| 0228040 | 7/1987 | European Pat. Off. . | |
| 0317867 | 5/1989 | European Pat. Off. . | |
| 0476476 | 3/1992 | European Pat. Off. . | |
| 2591704 | 6/1987 | France . | |
| 0708845 | 7/1941 | Germany . | |
| 0930961 | 7/1949 | Germany . | |
| 1871828 | 5/1963 | Germany . | |
| 3440603 | 5/1986 | Germany . | |
| 405248548 | 9/1993 | Japan | 277/53 |

*Primary Examiner*—William A. Cuchlinski, Jr.
*Assistant Examiner*—John L. Beres
*Attorney, Agent, or Firm*—Kenyon & Kenyon

[57] ABSTRACT

A shaft sealing system for an oil-lubricated shaft bearing in a stationary, externally closed housing filled with liquid vapor may include a shaft projecting into the housing which is mounted in the shaft bearing. The shaft bearing is sealed by means of a sealing arrangement. Sealing of the oil-lubricated shaft bearing that is improved and, in particular, independent of external air supply, is achieved by a counterpressure fan. The counterpressure fan generates a dynamic pressure directed against the sealing arrangement by drawing in outside air, and is held nonrotatably on the shaft on the side of the sealing arrangement facing away from the housing. The sealing arrangement has a flow channel corresponding to the counterpressure fan.

6 Claims, 1 Drawing Sheet

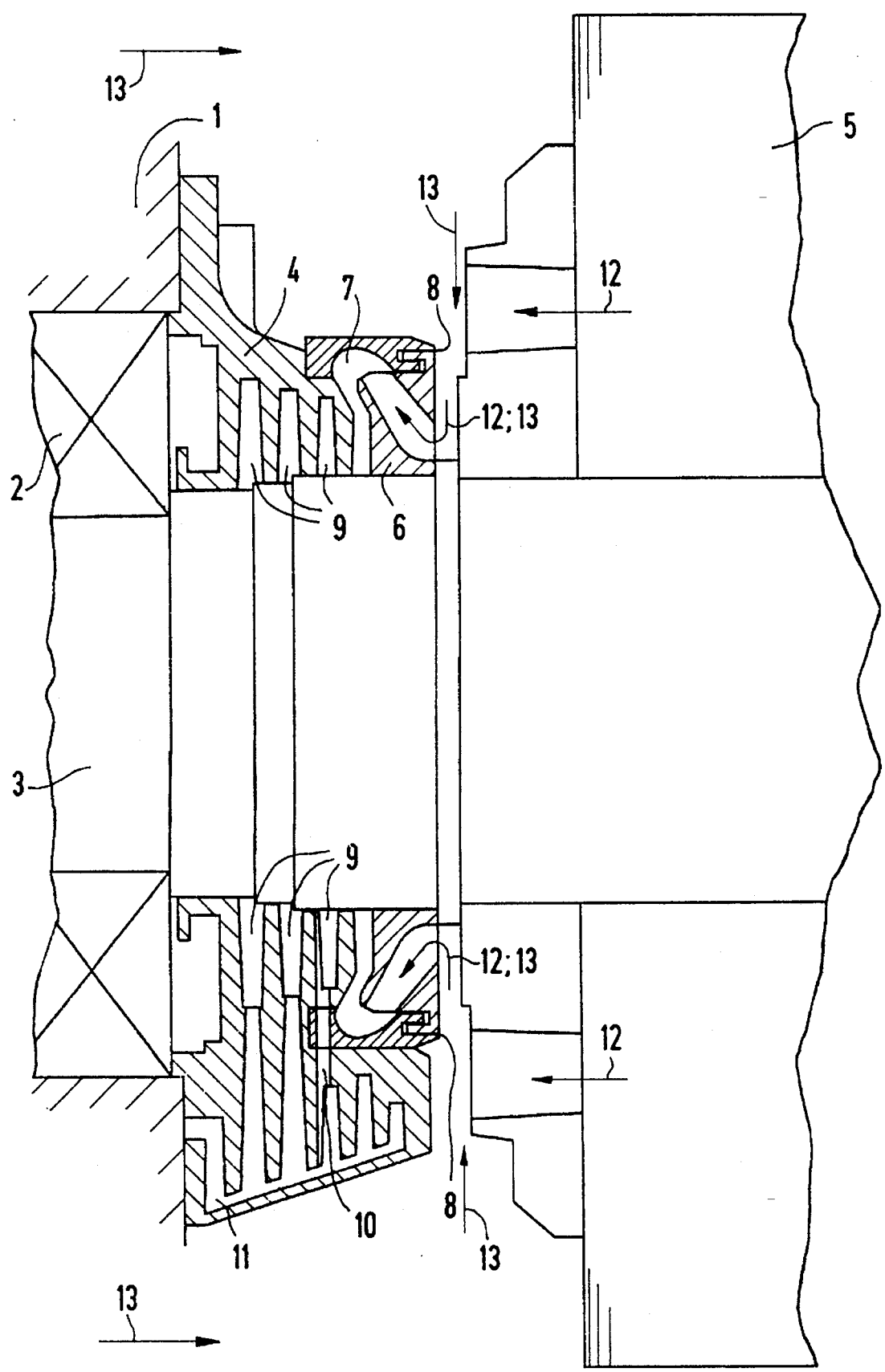

LABYRINTH SEAL HAVING A PRESSURE INDUCING FAN MEANS

BACKGROUND OF THE INVENTION

The present invention relates to a shaft sealing system for an oil-lubricated shaft bearing in a stationary, externally closed housing filled with liquid vapor, such that a shaft projecting into the housing is mounted in the shaft bearing, which is sealed by means of a sealing arrangement.

A shaft sealing system of this kind is disclosed, for example, in European Patent Document Nos. EP-A-0 317 867 or EP-A-0 476 476. The shaft sealing system of each of these references comprises a labyrinth sealing arrangement. Labyrinth sealing arrangements may be used to seal shafts which are driven by a high-speed drive motor. Such drive motors include, for example, electric driving motors which drive the wheels of vehicles via a gear drive, and are externally cooled by a fan unit.

In order to allow as little liquid as possible to emerge in the form of liquid vapor from the housing in which the oil-lubricated shaft bearing is held, over as long an operating period as possible, each liquid return channel in the labyrinth sealing arrangement according to European Patent Document No. EP-A-0 317 867 or European Patent Document No. EP-A 0 476 476 has a siphon-like liquid collecting section. The siphon-like liquid collecting section is continuously filled with liquid regardless of fluctuating pressure conditions on either side of the labyrinth seal, so that the liquid return channel is blocked by the liquid in vapor-tight fashion on both sides.

German Patent Document No. DE-U-18 71 828 discloses a shaft sealing system including a return flow screw and a contact seal element. The return flow screw with its housing, and the contact seal element, are arranged radially one above the other. This arrangement is made so that the seal element is associated with a stationary part and the countersealing surface consists of a rotating part that expands in the radial direction as rotation speed rises. The sealing gap between the stationary and rotating part becomes larger as rotation speed rises, and even more lubricating oil emerges. Additional emergence of lubricating oil from the bearing installation area is counteracted by a return flow screw. However, it is not possible for the lubricating oil to be returned into the bearing installation area. Emergence of oil vapor also cannot be prevented by the return flow screw. Return flow of lubricating oil that has already emerged also cannot be achieved by means of blocking air flowing toward the bearing installation area. If the blocking air pressure is too high, bearing lubrication is impaired or even entirely eliminated.

U.S. Pat. No. 2,188,856 describes a slinger disk for oil or oil vapor emerging from a bearing. The slinger disk comprises at least two disks immovably joined to one another, and is arranged in a closed space between bearing and seal. The oil and oil vapor emerging from the bearing collect in the closed space and are swirled around by the slinger disk. Return flow of oil into the bearing is also not possible with this arrangement.

In a further embodiment, the slinger disk is arranged behind the bearing sealing ring arrangement, and thus outside the bearing housing. In this case the only purpose of the slinger disk is to prevent penetration of solid or liquid foreign substances into the bearing housing.

German Patent Document No. DE-C-930 961 discloses a shaft sealing system which comprises a stationary seal carrier and a rotating spray ring between the seal carrier and shaft. The spray ring carries at least one slinger disk, by means of which the oil emerging from the bearing is slung into an oil collection trough formed by the seal carrier. The collected oil is removed via a discharge line.

SUMMARY OF THE INVENTION

The present invention creates a shaft sealing system that ensures even further improved sealing, in particular independently of an external air supply, of the oil-lubricated shaft bearing.

According to an embodiment of the present invention, a shaft sealing system for an oil-lubricated shaft barrier is provided in a stationary, externally closed housing filled with liquid vapor, such that a shaft projecting into the housing is mounted in the shaft bearing, which is sealed by means of a sealing arrangement. The shaft sealing system includes a counterpressure fan, which generates a dynamic pressure directed against the sealing arrangement. The counterpressure fan is held nonrotatably on the shaft on the side of the sealing arrangement facing away from the housing. The sealing arrangement has a flow channel corresponding with the counterpressure fan.

In the shaft sealing system according to an embodiment of the present invention, in which the sealing arrangement is preferably configured as a labyrinth seal, the counterpressure fan generates a dynamic pressure that is oriented opposite to the overpressure in the stationary housing. This guarantees reliable sealing of the oil-lubricated shaft bearing, even if the external air supply is reduced or absent.

BRIEF DESCRIPTION OF THE DRAWING

Further advantages and details of the present invention will become evident from the following description with reference to the drawing, which describe advantageous and exemplary embodiments of the present invention.

The sole drawing shows a partial longitudinal section through an electric driving motor in the region of its input drive-side bearing plate.

DETAILED DESCRIPTION

An oil-lubricated shaft bearing 2 is arranged in the input drive-side bearing plate 1. A shaft 3, projecting into a gear drive housing, is rotatably mounted in shaft bearing 2. The gear drive housing is not visible in the drawing, but is fastened to bearing plate 1 in a known manner to the left of shaft bearing 2.

The gear drive housing is externally sealed using sealing systems. To prevent the vapor of the lubricating oil for the gear drive from penetrating out of the gear drive housing into the driving motor, the oil-lubricated shaft bearing 2 is sealed by a sealing arrangement 4 on the side facing away from the gear drive housing. In the exemplary embodiment shown in the drawing, sealing arrangement 4 is configured as a labyrinth seal, and is fastened nonrotatably on the side of the input drive-side bearing plate 1 facing toward rotor 5 of the driving motor.

A counterpressure fan 6 is held nonrotatably on shaft 3 on the side of labyrinth seal 4 facing away from the gear drive housing. In addition, labyrinth seal 4 has a flow channel 7 corresponding with counterpressure fan 6.

Flow channel 7 extends in the circumferential direction of shaft 3, and in the exemplary embodiment shown in the drawing is held nonrotatably in labyrinth seal 4. However, labyrinth seal 4 and flow channel 7 can also be fabricated integrally in order to save assembly costs.

The stationary flow channel 7 and rotating counterpressure fan 6 are interlocked together via an axial labyrinth 8.

When shaft 3 is rotating, the gear drive gears driven by shaft 3 cause an overpressure in the gear drive casing, which causes oil vapor from the gear drive casing and oil from the oil-lubricated shaft bearing 2 to be forced axially toward rotor 5. Labyrinth seal 4 seals shaft bearing 2 with respect to the interior of the driving motor.

The overpressure present in the gear drive depends on rotation speed. As the rotation speed of the gear drive gears rises, the overpressure in the gear drive housing, which emerges via shaft bearing 2, increases.

According to an embodiment of the present invention, counterpressure fan 6 and corresponding flow channel 7 generate a dynamic pressure which is oriented opposite to the overpressure in the gear drive housing and which also increases with rising motor rotation speed. This ensures that the overpressure emerging from the gear drive housing via shaft bearing 2 delivers only small quantities of oil into labyrinth seal 4. The oil delivered into labyrinth seal 4 collects in annular groove-shaped labyrinth chambers 9 and runs via runoff holes 10 into a siphon-like liquid collecting section 11.

Since the dynamic pressure generated by counterpressure fan 6 has the same rotation speed dependency as the overpressure emerging from the gear drive housing, counterpressure fan 6 and the corresponding flow channel 7 allow an improved sealing of the oil-lubricated shaft bearing 2. In particular, the improved sealing is independent of any external air supply (arrow 12) under all operating conditions, since outside air (arrow 13) is always being drawn in by counterpressure fan 6.

The present invention, described for the sealing of a gear drive housing, can also be used with the same advantage for sealing other closed spaces, filled with liquid vapor, with respect to rotating parts projecting unilaterally into them or penetrating through them, to the outside or into adjacent sealed spaces. The sealing arrangement also does not necessarily need to be configured as a labyrinth seal. Sealing arrangements may be used according to embodiments of the present invention which consist of a combination of various seals (e.g., a combination of a labyrinth seal and a lip seal).

What is claimed is:

1. A shaft sealing system for an oil-lubricated shaft bearing in a stationary, externally closed housing filled with liquid vapor, such that a rotating shaft projecting into the housing is mounted in the shaft bearing, wherein the housing is externally sealed by a sealing arrangement, the shaft sealing system comprising:

a counterpressure fan generating a dynamic pressure directed against the sealing arrangement and held non-rotatably on the rotating shaft on a side of the sealing arrangement facing away from the housing, wherein the counterpressure fan is in front of the sealing arrangement and outside of the housing; and a flow channel of the sealing arrangement, the flow channel corresponding to the counterpressure fan;

wherein the sealing arrangement is arranged in a stationary manner relative to the rotating shaft.

2. A shaft sealing system according to claim 1, wherein the sealing arrangement is configured as a labyrinth seal.

3. A shaft sealing system according to claim 1, wherein the flow channel extends in a circumferential direction about the shaft.

4. A shaft sealing system according to claim 1, wherein the flow channel corresponding to the counterpressure fan is arranged in a stationary portion of the sealing arrangement.

5. A shaft sealing system according to claim 4, wherein the flow channel is formed integrally onto the sealing arrangement.

6. A shaft sealing system according to claim 3, wherein the counterpressure fan and the flow channel are interlocked together via an axial labyrinth.

* * * * *